United States Patent
King et al.

[11] Patent Number: 5,872,841
[45] Date of Patent: Feb. 16, 1999

[54] APPARATUS AND METHOD FOR SCHEDULING A TELEPHONE CALL

[75] Inventors: Neal J. King, Oakland; Michael Sassin; Jackson Hsi Yung Chow, both of San Jose; Eli Jacobi, Palo Alto; Matthew T. Dean, Campbell, all of Calif.

[73] Assignee: Siemens Information and Comunication Newtworks, Inc.

[21] Appl. No.: 746,690

[22] Filed: Nov. 14, 1996

[51] Int. Cl.[6] .................................................. H04M 3/48
[52] U.S. Cl. .................. 379/209; 379/88.01; 379/88.13; 379/202; 379/205
[58] Field of Search .................................... 379/202, 203, 379/204, 205, 206, 214, 67, 88, 89, 209, 88.01, 88.02, 88.13; 370/260, 261, 262, 270

[56] References Cited

U.S. PATENT DOCUMENTS

| | | | |
|---|---|---|---|
| 4,626,836 | 12/1986 | Curtis et al. | 345/156 |
| 4,783,800 | 11/1988 | Levine | 379/67 |
| 5,113,380 | 5/1992 | Levine | 379/93.23 |
| 5,136,581 | 8/1992 | Muehrcke | 379/206 |
| 5,185,782 | 2/1993 | Srinivasan | 379/214 |
| 5,289,531 | 2/1994 | Levine | 379/93.23 |
| 5,408,518 | 4/1995 | Yunoki | 379/202 |
| 5,434,908 | 7/1995 | Klein | 379/89 |
| 5,483,587 | 1/1996 | Hogan et al. | 379/202 |
| 5,483,588 | 1/1996 | Eaton et al. | 379/202 |
| 5,546,449 | 8/1996 | Hogan et al. | 379/202 |
| 5,559,875 | 9/1996 | Bieselin et al. | 379/202 |
| 5,619,555 | 4/1997 | Fenton et al. | 379/202 |
| 5,664,063 | 9/1997 | Johnson et al. | 395/101 |
| 5,668,863 | 9/1997 | Bieselin et al. | 379/202 |
| 5,719,928 | 2/1998 | Pinnell et al. | 379/202 |

FOREIGN PATENT DOCUMENTS

| | | |
|---|---|---|
| 0 435 449 | 7/1991 | European Pat. Off. . |
| 0 587 950 | 3/1994 | European Pat. Off. . |
| 0 608 654 | 8/1994 | European Pat. Off. . |

*Primary Examiner*—Scott Wolinsky

[57] ABSTRACT

A calendar system within a telephone system includes an interface for obtaining information from a calling party, calendar data which includes a calendar for a called party, and an agent. The agent, in response to a request to schedule a telephone call with the called party, searches the calendar of the called party to determine an available slot for the telephone call. After confirming that the available slot for the telephone call is acceptable to the calling party, the agent schedules the telephone call in the available slot of the calendar for the called party.

38 Claims, 12 Drawing Sheets

APPARATUS AND METHOD FOR SCHEDULING A TELEPHONE CALL

BACKGROUND

The present invention concerns telephone systems and pertains particularly to negotiating a scheduled telephone call.

Currently, a large percentage of telephone calls are not successfully completed. The unsuccessful calls are either directed into a voice mail system or fail because no one answers the call. When a calling party reaches the voice mail system, the calling party has two options. The calling party can hang up and attempt the call at a later time. Alternatively, the calling party can leave a message in the hope that the call will be returned.

If the calling party leaves a message and the called party attempts to return the call the return call also may fail to establish contact between the two parties. Also, if the original calling party tries again to make contact, there is no guarantee that the call will successfully connect the parties. When both parties have active schedules, a common result is "phone tag" where each party has to return many calls before the parties successfully connect with one another.

SUMMARY OF THE INVENTION

In accordance with the preferred embodiment of the present invention, a calendar system within a telephone system includes an interface for obtaining information from a calling party (i.e., the initiator of the scheduling of the telephone call), calendar data which includes a calendar for a called party (i.e., the other party to the telephone call), and an agent module. In response to a request to schedule a telephone call, the agent module searches the calendar of the called party to determine an available slot for the slot for the telephone call. After confirming that the available slot for the telephone call is acceptable to the calling party, the agent module schedules the telephone call in the available slot of the calendar for the called party.

The present invention provides an efficient way to schedule telephone calls and facilitate a successful connection between a calling party and a called party.

DESCRIPTION OF THE PREFERRED EMBODIMENT

Figure 1:
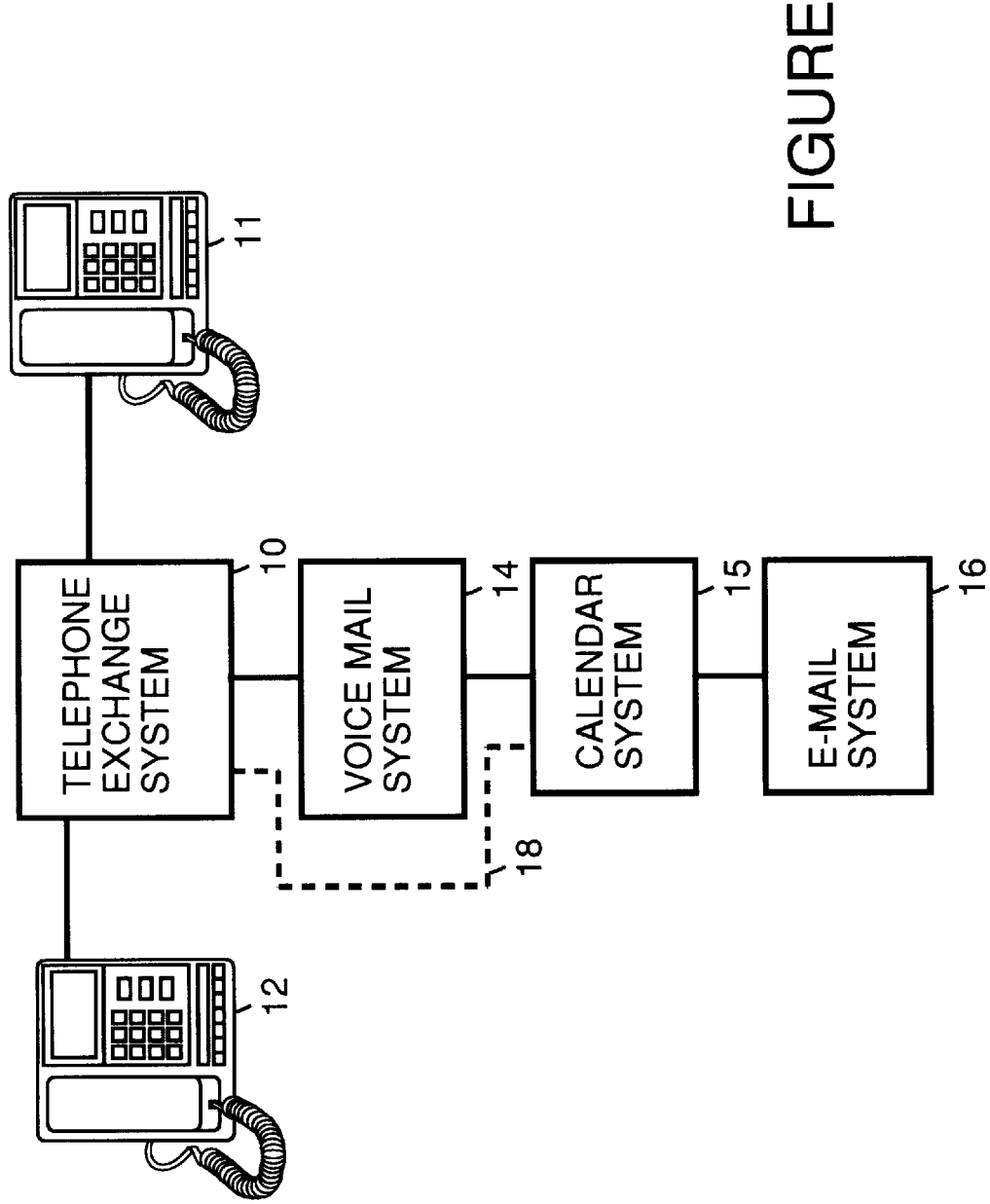
FIG. 1 is a simplified block diagram of a telephone system which includes a calendaring function in accordance with a preferred embodiment of the present invention.

A calendar system within a telephone system includes an interface for obtaining information from a calling party (i.e., the initiator of the scheduling of the telephone call), calendar data which includes a calendar for a called party (i.e., the other party to the telephone call), and an agent module. The agent module, in response to a request to schedule a call by the calling party, searches the calendar of the called party to determine an available slot for the telephone call. After confirming that the available slot for the telephone call is acceptable to the calling party, the agent module schedules the telephone call in the available slot of the calendar for the called party.

For example, the interface includes keypad recognition technology for recognizing input from the calling party when the calling party utilizes a telephone keypad. Also, the interface includes speech synthesis technology for communicating with the calling party using speech synthesis. In addition, in a preferred embodiment of the present invention, the interface includes speech recognition technology for recognizing input from the calling party when the calling party communicates by speech.

Additionally, as further described below, the calendar optionally includes, an electronic mail system interface for interfacing with an electronic mail system, a database for storing information identifying the called party, and, in some cases, the calling party. Additionally, calendar system can include a network interface for communicating over a network with a second calendar system which includes a calendar for the calling party.

As further described below, the calendar system schedules the telephone call by obtaining from the calling party an estimated duration of a telephone call. The calendar system then searches a calendar of a called party to determine an available slot for the telephone call. The calendar system then confirms that the available slot for the telephone call is acceptable to the calling party, and having done so, schedules the telephone call in the available slot of the calendar of the called party.

The estimated duration of the telephone call is obtained from the calling party, for example, by requesting the calling party to indicate the estimated duration of the telephone call, and receiving from the calling party the estimated duration of the telephone call. The calling party can communicate the estimated duration using a telephone keypad or using speech which is recognized by the calendar system using speech recognition technology.

The calendar system confirms that the available slot for the telephone call is acceptable to the calling party, for example, by checking a calendar for the calling party to determine whether the available slot for the telephone call is available in the calendar for the calling party. Once this is done, the calendar system can schedule the telephone call in the calendar of the calling party.

Alternatively, the calendar system confirms that the available slot for the telephone call is acceptable to the calling party by querying the calling party as to whether the available slot for the telephone call is acceptable to the calling party. Once a call is scheduled, the called party (and optionally the calling party) can be notified by electronic mail.

FIG. 1 shows a simplified block diagram of a telephone system A telephone 11 and a telephone 12 are both connected to a telephone exchange system 10. Telephone exchange system 10 is, for example, a central office switch, a private telephone exchange (PBX) or some other form of switch. A voice mail system 14 is connected to telephone exchange system 10. When a call is made to a telephone connected to telephone exchange system 10, the call may be directed to voice mail system 14 when the called party does not respond to the call or is currently occupied with another call.

In the preferred embodiment of the present invention, voice mail system 14 can access calendar system 15 to schedule a return call. When the return call is scheduled the scheduled time is forwarded to the calling party, for example back through voice mail system 14 or through an electronic mail (e-mail) system 16.

As represented by a dotted line 18, instead of the embodiment shown in FIG. 1, calendar system 15 maybe directly connected to telephone exchange system 15. In this case, communication between voice mail system 14 and calendar system 15 is through telephone exchange system 10.

Figure 2:
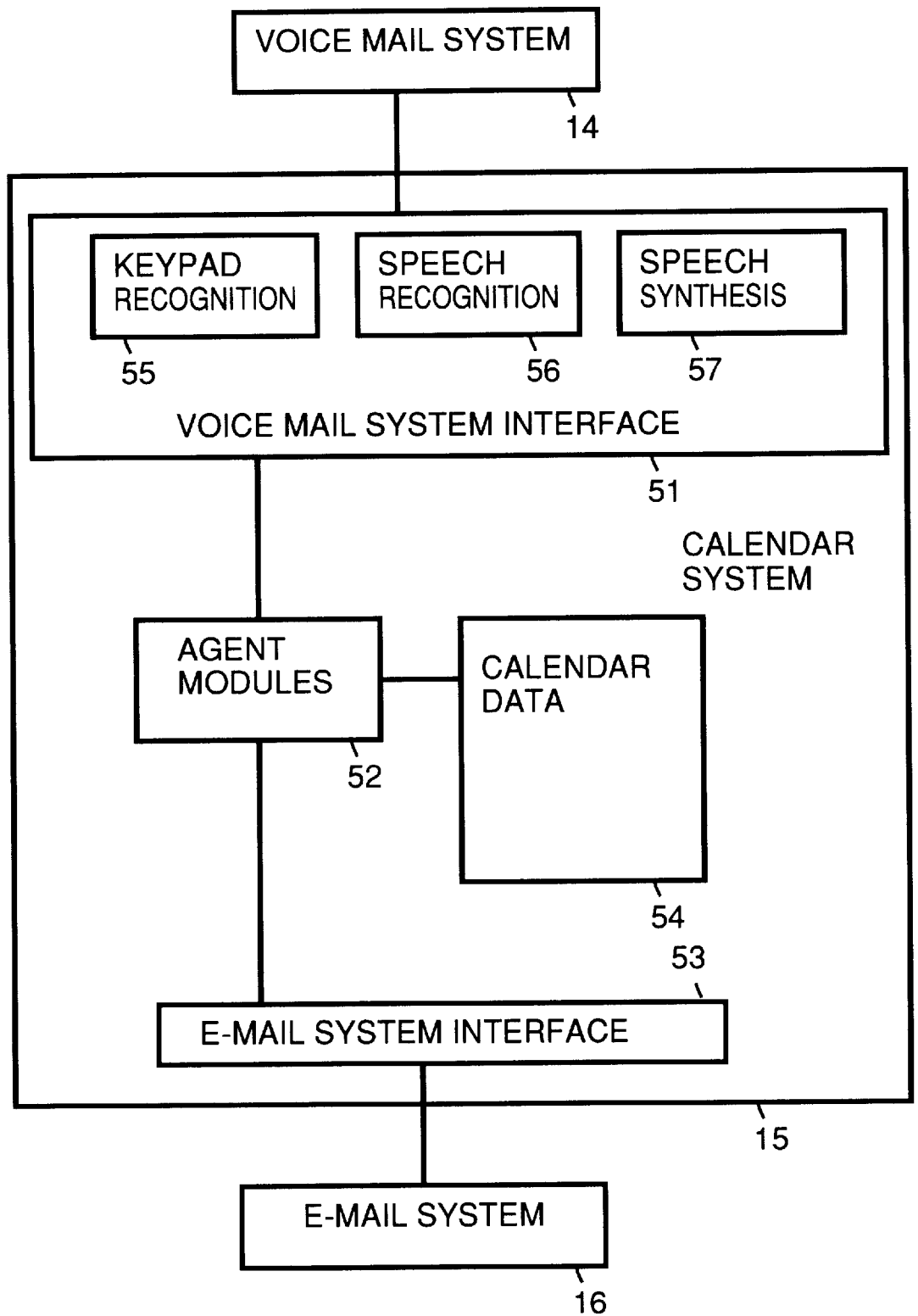
FIG. 2 is a simplified block diagram of a calendar system shown in FIG. 1 in accordance with a preferred embodiment of the present invention.

FIG. 2 shows a block diagram of calendar system 15. Calendar system 15 includes a voice mail system interface 51 which interacts with voice mail system 14 and an e-mail system interface 53 which interfaces with e-mail system 16. Calendar data 54 includes calendars for various users who have a local number belonging to telephone exchange system 10. In order to allow calendar system 15 to communicate with a calling party, voice mail system interface 51 includes, for example, keypad recognition technology 55, speech recognition technology 56, speech synthesis technology 57. The connection between voice mail system 14 and voice mail system interface 51 is, for example, an analog phone connection. Alternatively, the interface is over a digital communication link, such as a high bandwidth LAN or any other medium capable of providing the transfer of voice and keypad information.

For example, when a calling party from telephone 12 makes a call to telephone 11 which is unanswered, voice mail system 14, after capturing the number of calling telephone 12, plays an announcement which presents options to the calling party from telephone 12. The calling party either hangs up or responds to the options by pressing a digit on telephone phone 12 to forward a touch tone signal through telephone exchange system 10 to voice mail system 14. The options include, for example, leaving a voice mail message or scheduling a return call.

When the calling party selects to schedule a return call, voice mail system 14 forwards the request for a return call and the captured telephone number to calendar system 15. Voice mail system interface 51, for example, can capture additional information from the calling party on telephone 12, if desired. For example, voice mail system interface 51 can request from the calling party an estimated duration of the call. The calling party can respond, for example using the digits of telephone 12 to forward to voice mail system interface 51 a number which represents the estimated number of minutes for the call. This information is captured using keypad recognition technology 55. Alternative to use of a keypad recognition technology 55 to capture data, other methods may be used. For example, voice mail system interface 51 can use speech recognition technology 56 to capture spoken information from the calling party.

Calendar system 15 starts an agent module which checks the calendars for the calling party from telephone 12 and the called party at telephone 11 in order to schedule a return call.

Figure 3:
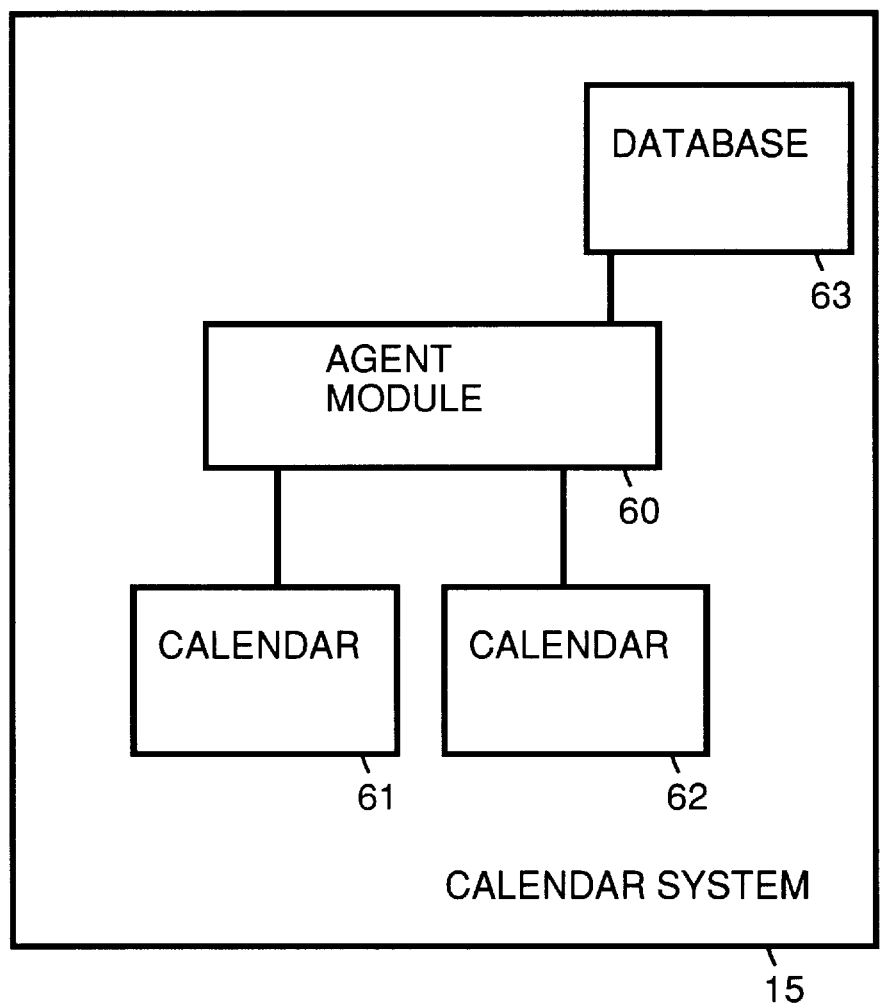
FIG. 3 is a simplified block diagram which illustrates operation of an agent module operating within the calendar system shown in FIG. 1 in accordance with a preferred embodiment of the present invention.

For example, FIG. 3 shows an agent module 60 which accesses a calendar 62 for the calling party from telephone 12 and accesses a calendar 61 for the called party of telephone 11. Agent module 60 accesses a database 63 for information about particular individuals. For example, the calendar for the called party of telephone 11 is shown in Table 1 below:

TABLE 1

| Time | Event | Phone Number |
|---|---|---|
| 8:00 | Not Available | Office Phone |
| 8:15 | Meeting | Office Phone |
| 8:30 | " | Office Phone |
| 8:45 | " | Office Phone |
| 9:00 | " | Office Phone |
| 9:15 | Available | Office Phone |
| 9:30 | Available | Office Phone |
| 9:45 | Available | Office Phone |
| 10:00 | Expect call from Bill Smith | Office Phone |
| 10:15 | Expect call from Bill Smith | Office Phone |
| 10:30 | Available | Office Phone |
| 10:45 | Available | Office Phone |
| 11:00 | Call Mary Jones | Office Phone |
| 11:15 | Call Mary Jones | Office Phone |
| 11:30 | Available | Office Phone |
| 11:45 | Available | Office Phone |
| 12:00 | Lunch | Cellular Phone |
| 12:15 | Lunch | Cellular Phone |
| ... | | |
| 6:00 | Home (urgent only) | Home Phone |
| 6:15 | Home (urgent only) | Home Phone |

An example calendar for the calling party from telephone 12 is shown in Table 2 below:

TABLE 2

| Time | Event | Phone Number |
|---|---|---|
| 8:00 | Available | Office Phone |
| 8:15 | Available | Office Phone |
| 8:30 | Available | Office Phone |
| 8:45 | Not Available | Office Phone |
| 9:00 | Not Available | Office Phone |
| 9:15 | Meeting | Office Phone |

TABLE 2-continued

Calendar

| Time | Event | Phone Number |
| --- | --- | --- |
| 9:30 | Meeting | Office Phone |
| 9:45 | Meeting | Office Phone |
| 10:00 | Call John Sanchez | Office Phone |
| 10:15 | Available | Office Phone |
| 10:30 | Available | Office Phone |
| 10:45 | Available | Office Phone |
| 11:00 | Call Jerry Chow | Office Phone |
| 11:15 | Call Jerry Chow | Office Phone |
| 11:30 | Lunch | Cellular Phone |
| 11:45 | Lunch | Cellular Phone |
| 12:00 | Lunch | Cellular Phone |
| 12:15 | Lunch | Cellular Phone |
| ... | | |
| 5:30 | Home (urgent only) | Home Phone |
| 5:45 | Home (urgent only) | Home Phone |

Figure 4:
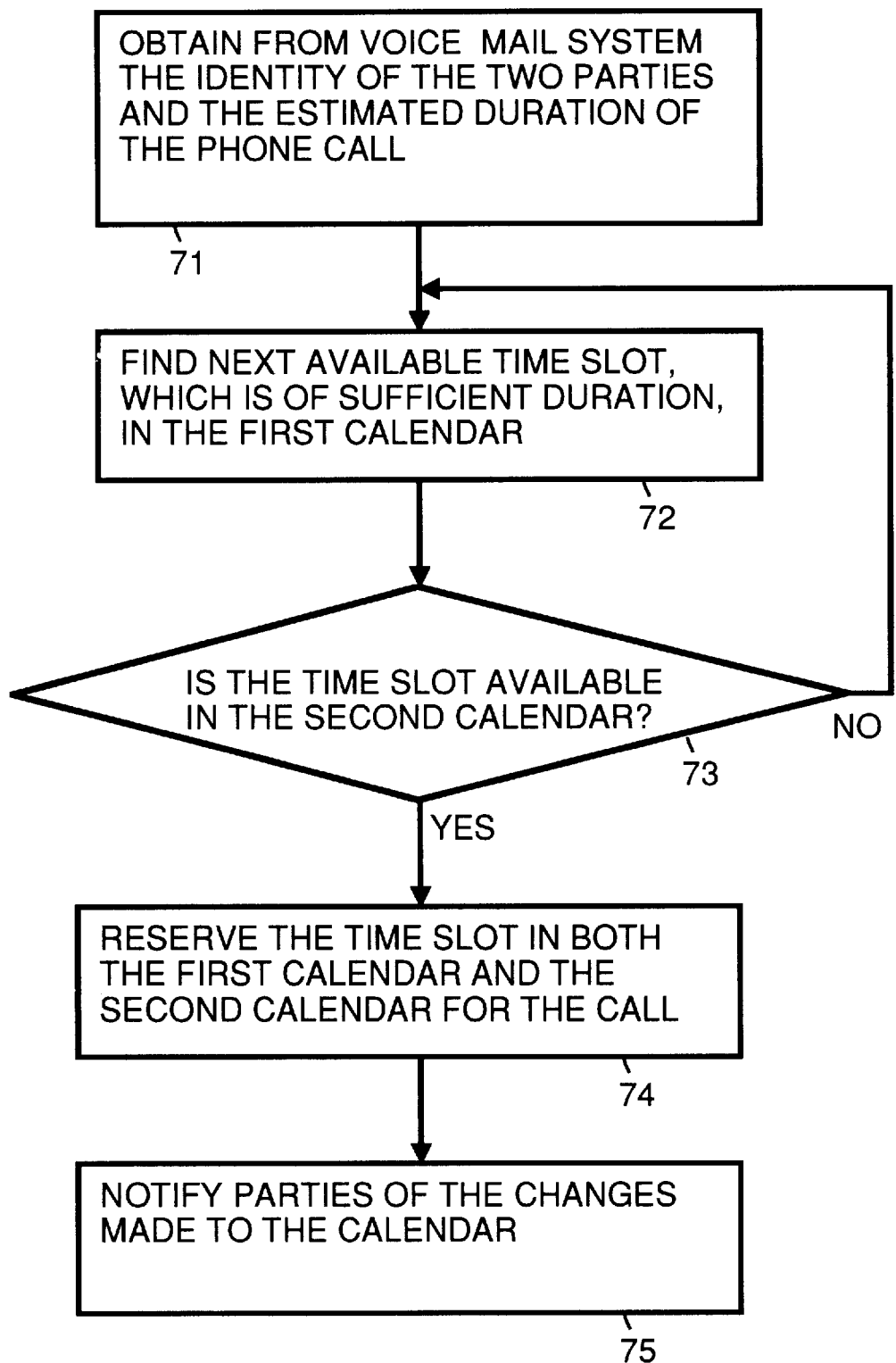
FIG. 4 is a simplified flowchart which illustrates operation of the agent module shown in FIG. 3 in accordance with a preferred embodiment of the present invention.

FIG. 4 is a flowchart which describes how agent module 60 schedules a telephone call between two parties with calendars kept within calendar system 15. In a step 71, agent module 60 obtains the identity of the two parties and the estimated duration of the telephone call. Various information can be obtained from the calling party by voice mail system interface 51 (or voice mail system 14) before agent module 60 is started, as discussed above. Alternatively, agent module 60, once started, can obtain the information by querying the calling party using voice mail system interface 51. For example, in the one embodiment of the present invention, agent module 60, using speech synthesis technology 57 in voice mail system interface 51, queries the calling party as to which party will initiate the telephone call. This information is indicated in the calendars of the called party and the calling party when the telephone call is scheduled in these calendars.

Alternative to querying the called party for this information in step 71, this information may queried for when the information is actually placed in the calendar.

In one preferred embodiment of the present invention, the called party can indicate a preference as to who will perform the call back. This preference is stored, for example, within data base 63, or within the calendar for the called party. When configuring the calendar, the called party chooses one of the following options: (1) the called party always will make the call back; (2) the calling party always will make the call back; (3) the called party indicates a preference for the calling party to call back, but the calling party can overrule this preference; (4) the called party indicates a preference for the called party to call back, but the calling party can overrule this preference; (5) the called party indicates no preference, the calling party may freely choose the party to be called back and the default is the calling party will call back; (6) the called party indicates no preference, the calling party may freely choose the party to be called back and the default is the called party will call back; or (7) the called party indicates a preference based on the number for the calling party at the time of call back (i.e., if it is an expensive call, the called party may prefer not to make the call back).

Calendar system 15 initially identifies the two parties by telephone numbers. However, in the preferred embodiment of the present invention, agent module can use the telephone number of a subscriber on the system to obtain from database 63 a name associated with each telephone number. For example, a look-up in database 63 of the number of the calling party from telephone 12 identifies the calling party as Carol Nichols, and a look-up in database 63 of the number of the called party from telephone 11 identifies the called party as Jim Rey. Also, for example, the requested duration of the phone call is 30 minutes.

In a step 72, agent module 60 finds a next available time slot, which is of sufficient duration for the telephone call, in the first calendar. For the example call discussed above, the first available time slot in the calendar shown in Table 1 is the slot from 9:15 AM through 9:45 AM.

In a step 73, agent module 60 determines whether this time slot is available in the second calendar. In the calendar shown in Table 2, the slot from 9:15 AM through 9:45 AM is occupied by a meeting. Therefore agent module 60 would return to step 72.

In step 72, agent module 60 finds a next available 30 minute time slot in the first calendar. For the calendar shown in Table 1, the next available 30 minute slot is from 9:30 AM through 10:00 AM.

In a step 73, agent module 60 determines whether this time slot is available in the second calendar. In the calendar shown in Table 2, the slot from 9:30 AM through 10:00 AM is occupied by a meeting. Therefore agent module 60 would return to step 72.

In step 72, agent module 60 finds a next available time slot, which is of sufficient duration, in the first calendar. For the calendar shown in Table 1, the next available 30 minute slot is from 10:30 AM through 11:00 AM.

In a step 73, agent module 60 determines whether this time slot is available in the second calendar. In the calendar shown in Table 2, the slot from 10:30 AM through 11:00 AM is available. Therefore agent module 60 continues to a step 74.

In step 74, agent module 60 reserves the time slot in both the first calendar and the second calendar for the call. Thus, for the example shown, agent module 60 writes into the calendar shown in Table 1, for the time slot from 10:30 AM through 11:00 AM, the following: "Call Carol Nichols". Likewise, agent module 60 writes into the calendar shown in Table 2, for the time slot from 10:30 AM through 11:00 AM, the following: "Expect call from Jim Rey". Additional information may also be written into the calendar for the telephone call. For example, each calendar may indicate who will initiate the telephone call. Also, the calendar may indicate a telephone number where each party may be reached. This telephone number may be different from the telephone number of telephone 11 or telephone 12, respectively. In various embodiments of the present invention, during step 74, calendar system 15 can query the called party for additional information. For example, provided the called party is willing to allow the calling party to express a preference, calendar system 15 can query the called party as to who shall initiate the call back.

In a step 75, agent module 60 notifies parties of the changes made to the calendars. For example, agent module 60 does this utilizing electronic mailing system 16. Alternatively, or in addition, agent module notifies parties of the changes made to the calendars utilizing speech synthesis technology 57 within voice mail system interface 51.

Figure 5:
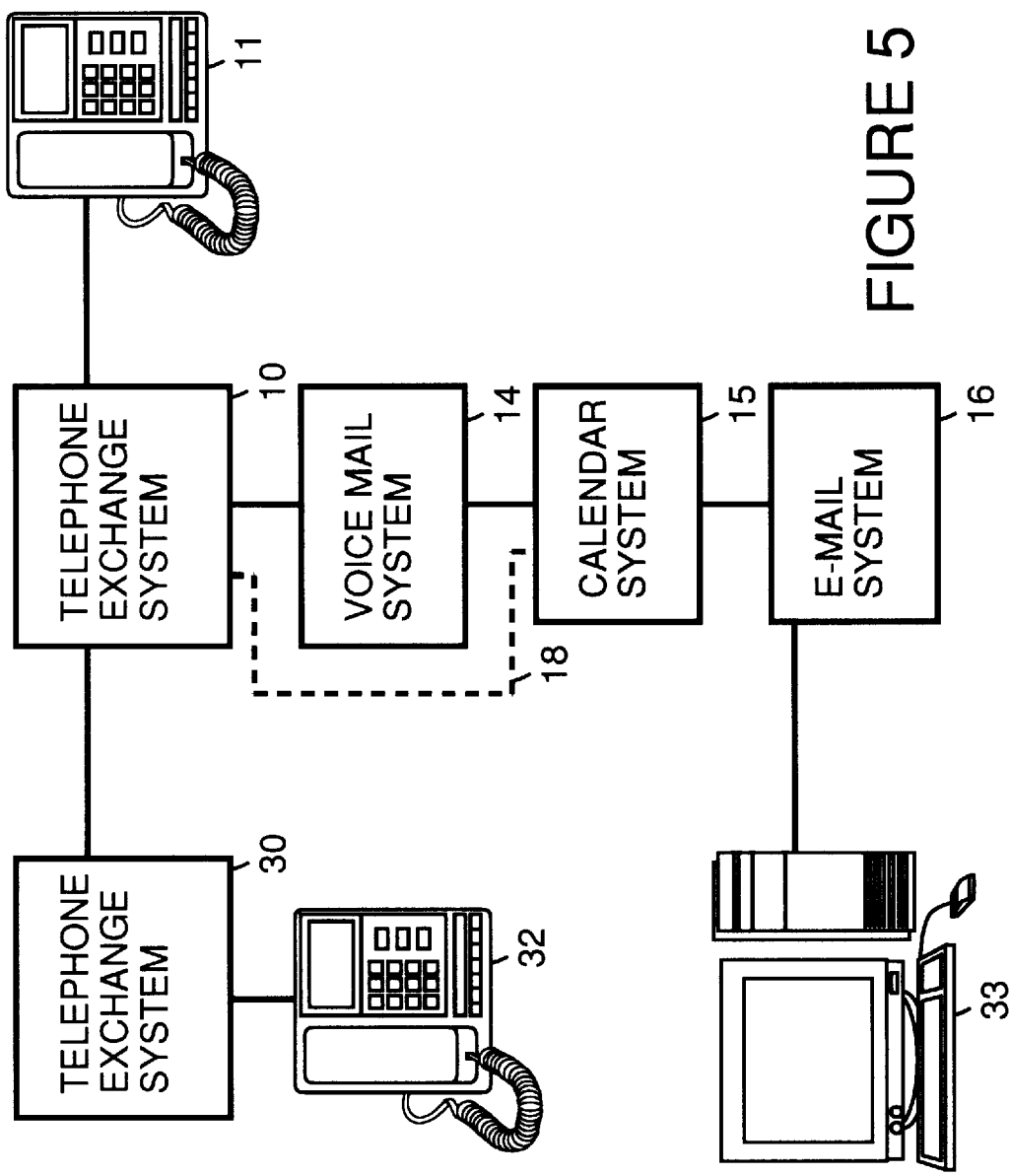
FIG. 5 is a simplified block diagram which illustrates access, by another telephone exchange system, to the telephone system and the calendaring function shown in FIG. 1 in accordance with a preferred embodiment of the present invention.

FIG. 5 illustrates an embodiment of the present invention where calendar system 15 contains a calendar for the called party but not for the calling party. For example, a calling party calls from a telephone exchange system 30. A telephone 32 is connected to telephone exchange system 30. A computing system 33 for the calling party also may be networked, for example to e-mail system 16.

Figure 6:
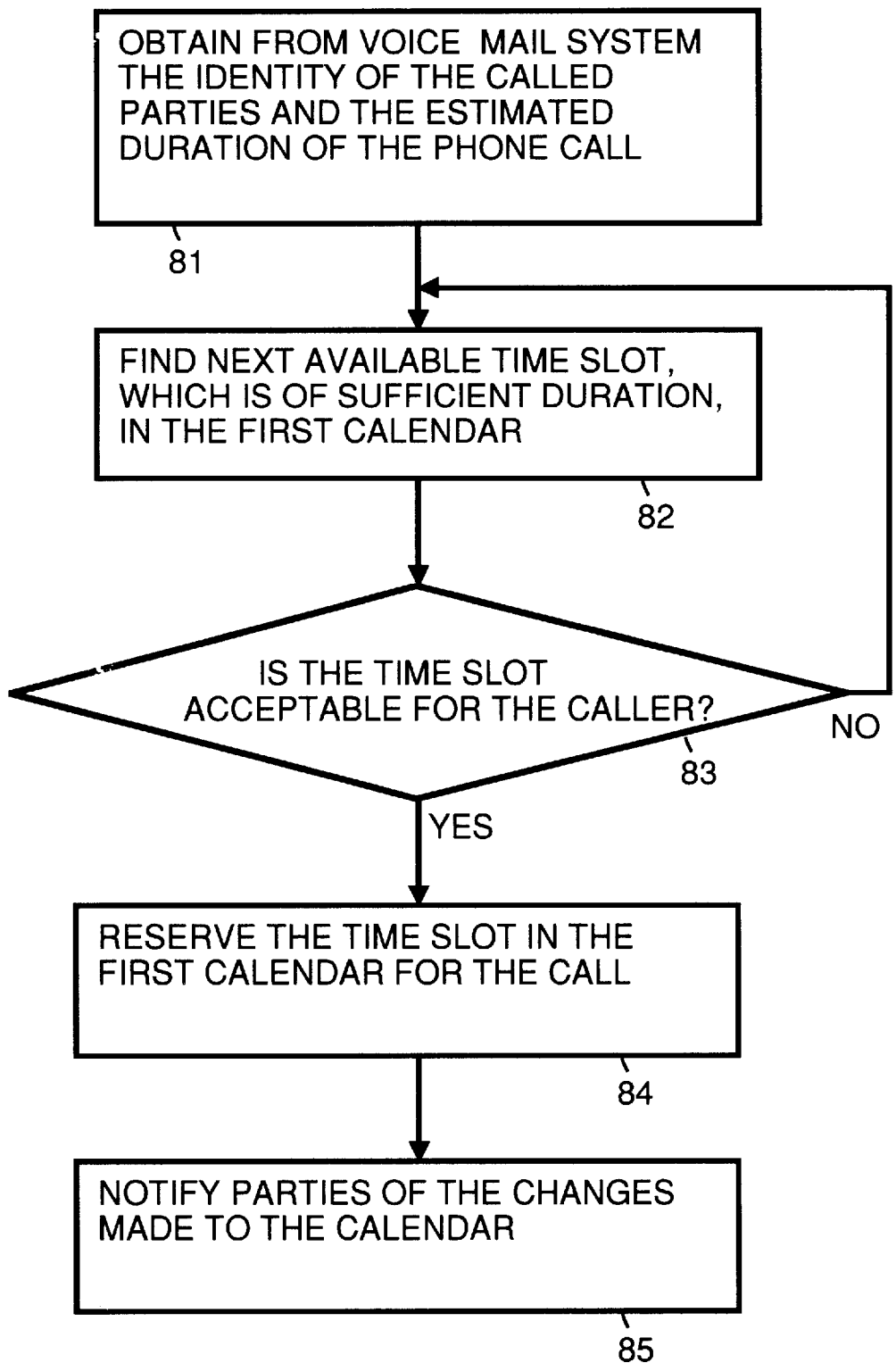
FIG. 6 is a simplified flowchart which illustrates operation of an agent module in accordance with an alternative preferred embodiment of the present invention.

FIG. 6 is a flowchart which describes how the agent module schedules a call between two parties when only the called party has a calendar kept within calendar system 15, for example, as in the system in FIG. 5. In a step 81, the agent module obtains the identity of the called party. Additional information, such as the estimated duration of the phone call and who will initiate the telephone call, is obtained, for example by querying the calling party and requesting the calling party to input from the calling party's telephone keypad. Alternatively, speech recognition can be used to obtain input from the calling party. Also, configured preferences of the called party, for example as to who will make the call back, may dictate what additional information is sought and how that information will be used.

The agent module obtains information on the called party using a database look-up on the called telephone number. As discussed above, in the preferred embodiment of the present invention, the agent module can use the telephone number of a subscriber on the system to obtain from database 63 a name associated with each telephone number.

In a step 82, the agent module finds a next available time slot, which is of sufficient duration for the telephone call, in the calendar of the called party.

In a step 83, the agent module queries the calling party as to whether this time slot is available in the second calendar. This is done, for example, by speech synthesis which requests the calling party to make a particular input on a keypad (or indicate by voice if speech recognition is used), if the suggested time slot is acceptable to the calling party. The calling party responds by accepting or rejecting the suggested time slot. If the calling party rejects the time slot, steps 82 and 83 are repeated until an acceptable time slot is found.

In a step 84, the agent module reserves the time slot in the calendar for the called party. Additional information may be exchanged between the agent module and the calling party. For example, the agent module can query the calling party for a number at which the calling party may be reached. Also, the agent module can query the calling party as to who will initiate the telephone call. However, if the called party has expressed a preference as to who will make the call back, the indicated preference of the called party will be followed. The calling party responds, for example, via a keypad or by voice (when speech recognition is implemented). In a preferred embodiment of the present invention, the calling party's number is captured when the call is originally made. Also, in a preferred embodiment, the agent module communicates to the calling party the number where the called party may be reached if it is not the number originally dialed by the calling party. This communication is accomplished, for example, using speech synthesis.

In a step 85, the agent module notifies the called party of the changes made to the calendar. For example, the agent module does this utilizing electronic mailing system 16 or voice mail system 14. Additionally, when the agent module possesses an e-mail address for the calling party (for example by querying the calling party for an e-mail address or via a data base look-up on the calling party's number or other calling party identification), the agent module confirms to the calling party, e.g., to an e-mail address associated with computing system 33, information pertaining to the telephone call.

Figure 7:
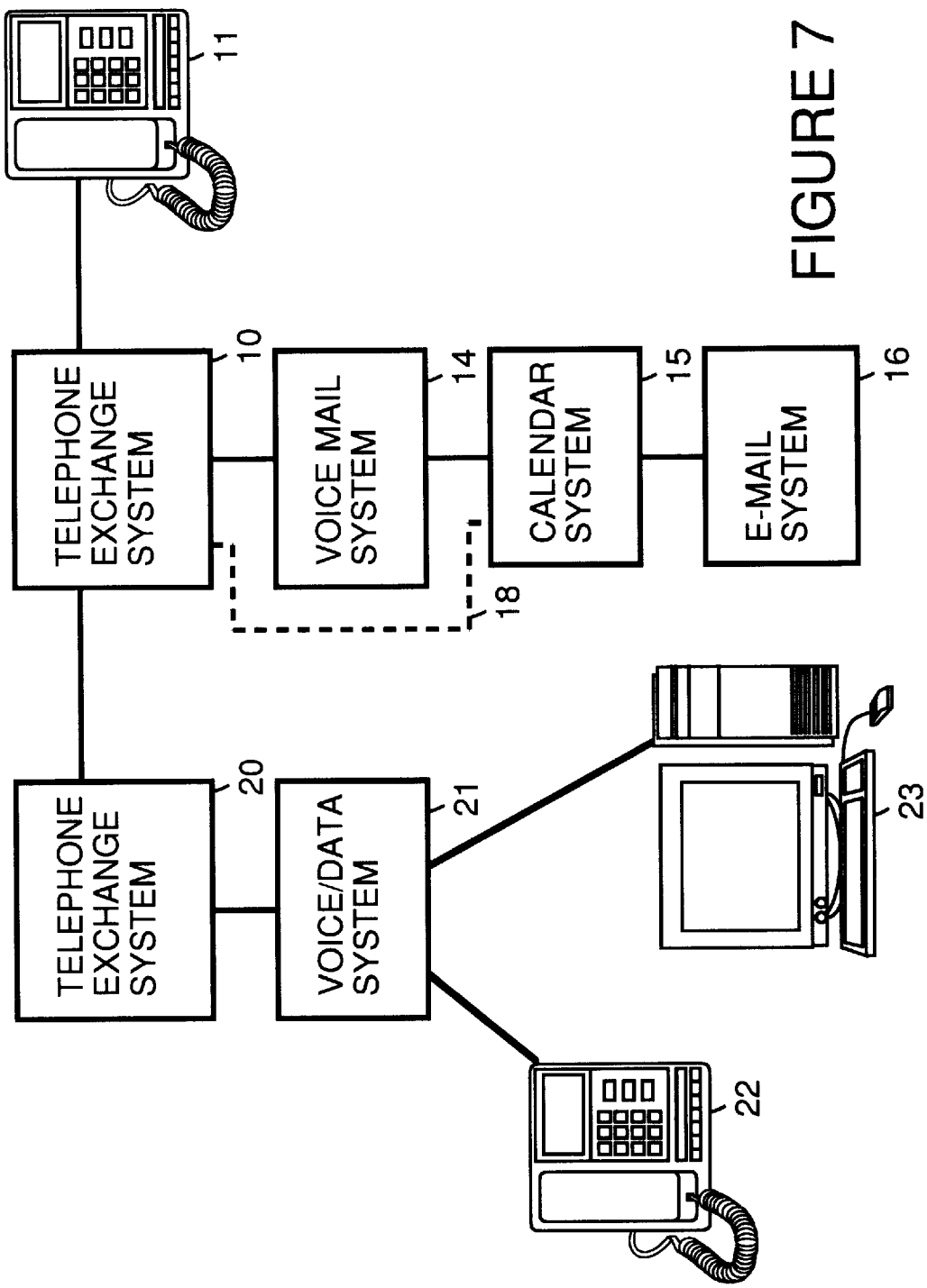
FIG. 7 is a simplified block diagram which illustrates access, by another telephone exchange system, to the telephone system and the calendaring function shown in FIG. 1 in accordance with an alternative preferred embodiment of the present invention.

FIG. 7 illustrates another embodiment where calendar system 15 contains a calendar for the called party but not for the calling party. However, the embodiment of the present invention shown in FIG. 7 allows a computing system 23, which utilizes a calendar from the calling party, to interact with an agent module within calendar 15 to schedule a call.

For example, as shown in FIG. 7, a voice/data system 21 is connected to both a telephone 22 and a computing system 23. Voice/data system 21 is also connected to telephone exchange system 20. Telephone exchange system 20 is, for example, a central office switch, a private telephone exchange (PBX) or some other form of switch. Once a calling party from telephone system 22 indicates to voice mail system 14 a desire to schedule a telephone call, voice/data system 21 connects computing system 23 through to an agent module within calendar system 15 in order to allow automated scheduling of a telephone call. The scheduling is accomplished, for example, by computing system 23 downloading a calendar for the calling party through to calendar system 15. The agent module within calendar system 15 can then schedule a call as set out in the method set out in FIG. 4. Alternatively, the agent module within calendar system 15 can forward to computing system 23 potential time slots which computing system, after consulting a calendar for the calling party, can either accept or reject.

Once a time slot has been agreed to, the agent module within calendar 15 reserves the time slot in calendar for the called party. Additional information may also be written into the calendar for the telephone call. For example, the calendar may indicate who will initiate the telephone call. However, if the called party has expressed a preference as to who will make the call back, the indicated preference of the called party will be followed. Also, the calendar may also indicate a telephone number where the calling party may be reached. The called party is also informed as to the change in his calendar, for example by voice mail or electronic mail. Computing system 23 can likewise schedule the telephone call in a calendar for the calling party and/or inform the calling party of the telephone call information by, for example, electronic mail. Alternatively or in addition, after the telephone call is scheduled, voice/data system 21 can re-connect telephone 22 with telephone exchange system 20, and calendar system 15 can inform the calling party of the scheduled telephone call information, for example using speech synthesis.

Figure 8:
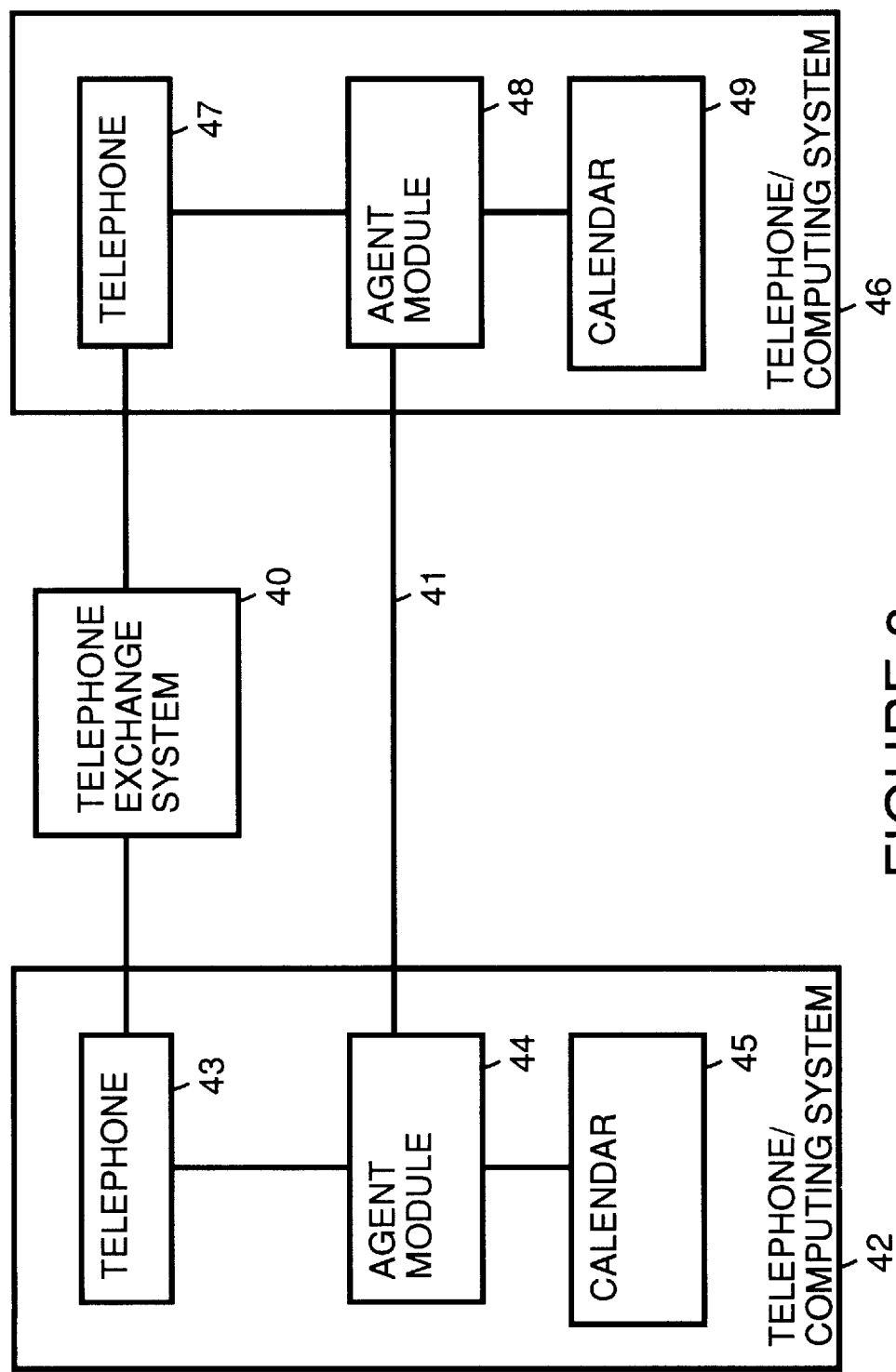
FIG. 8 is a simplified block diagram of a calendar system within a computing system in accordance with an alternative preferred embodiment of the present invention.

FIG. 8 illustrates another embodiment where a telephone 43 within a telephone/computing system 42, through a telephone exchange system 40, is connected to a telephone 47 within a telephone/computing system 46. Once a calling party from telephone 43 indicates to telephone/computing system 46 a desire to schedule a telephone call, an agent module 48 within telephone/computing system 46 contacts an agent module 44 within telephone/computing system 42 to schedule a telephone call. This may be accomplished, for example, by agent module 44 downloading a calendar 45 for the calling party through to agent module 48. Agent module 48 can then utilize calendar 45 for the calling party and a calendar 49 for the called party to schedule a call utilizing, for example, the method set out in FIG. 4. Alternatively, agent module 48 can forward to agent module 44 potential time slots which, after comparing the time slots with available times in calendar 45, agent module 44 can either accept or reject. Once a time slot has been selected agent module 44 can schedule the call, along with any additional information (e.g., a number where the called party can be reached) in calendar 45. Likewise, agent module 48 can schedule the call, along with any additional information (e.g., a number where the original calling party can be reached) in calendar 49. Alternatively or in addition, after the telephone call is scheduled, agent module 14, through telephone 47 can inform the calling party of the scheduled telephone call information, for example using speech synthesis. To facilitate communication between agent modules, the agent modules can be written to function on a common platform such as JAVA. Agent modules 44 and 48 can communicate via a data link through telephone exchange system 40, or can communicate over another data link 41. For example, the data link through telephone exchange system 40 is the same link that is used for the original call. This link is originally a voice link from telephone 43 to telephone 47 and is switched to handle data transfer between agent module 44 and agent module 48. Data link 41 is, for example, a local area network (LAN) a wide area network (WAN), the internet, or some other form of network or connecting media.

Figure 9:
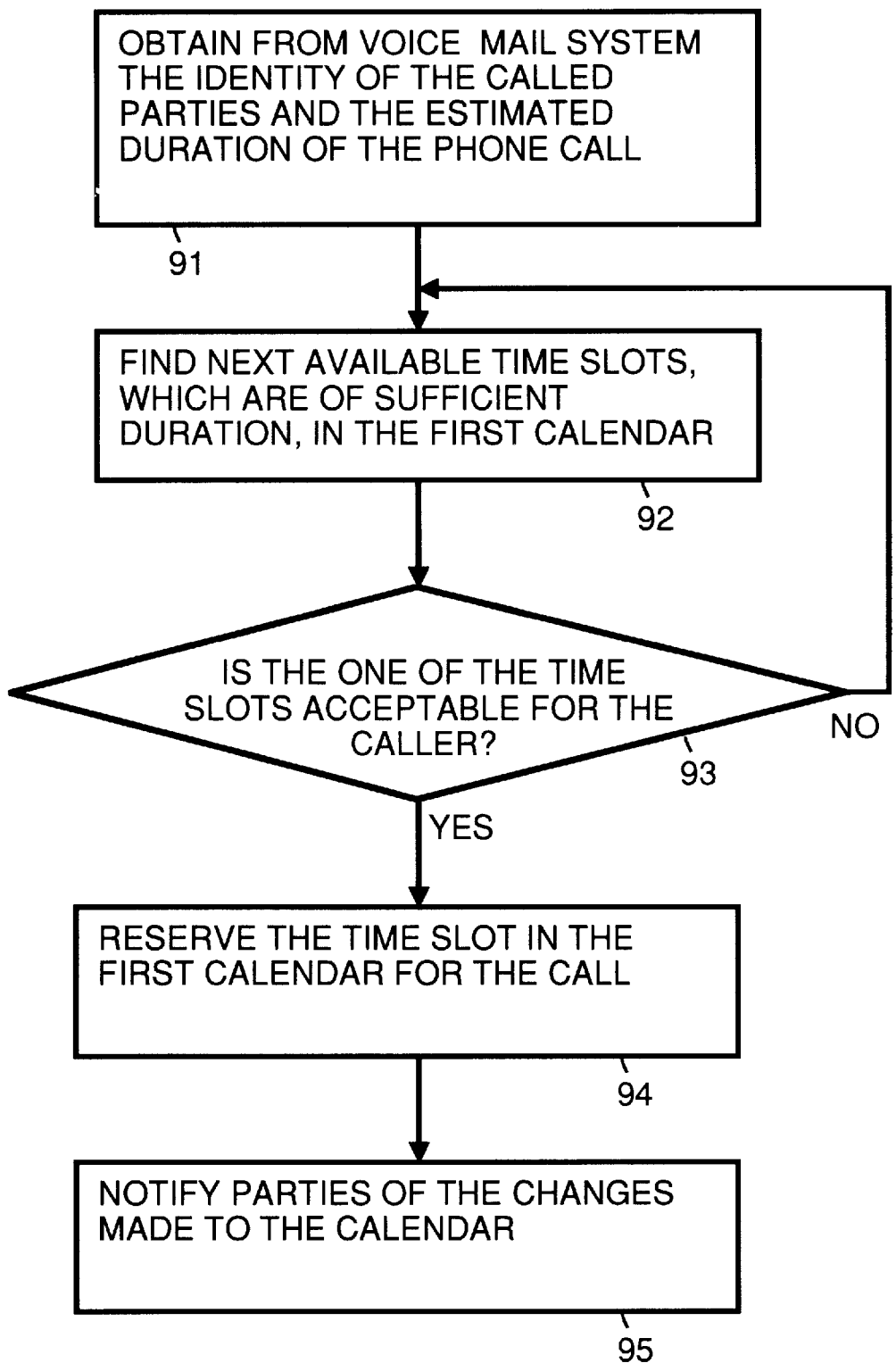
FIG. 9 is a simplified flowchart which illustrates operation of an agent module in accordance with another alternative preferred embodiment of the present invention.

FIG. 9 is a flowchart which illustrates an alternative method by which the agent module schedules a call between two parties when only the called party has a calendar kept within calendar system 15. The method used is alternative to the embodiment described in FIG. 6.

In a step 91, the agent module obtains the identity of the called party. Additional information, such as the estimated duration of the phone call and who will initiate the telephone call, is obtained, for example by querying the calling party and requesting the calling party to input from the calling party's telephone keypad. However, if the called party has expressed a preference as to who will make the call back, the indicated preference of the called party will be followed. Also, speech recognition can be used to obtain input from the calling party.

In a step 92, the agent module finds a number (i.e., two or more) of available time slots, which are of sufficient duration for the telephone call, in the calendar of the called party. By finding a number of available time slots, this can, in some cases, reduce the overhead in scheduling the telephone call. The maximum number of time slots found may be optimized for a particular system. For example, the maximum number of time slots may be between two and five.

In a step 93, the agent module queries the calling party as to whether any of the suggested time slots are acceptable. This is done, for example, by speech synthesis which requests the calling party to make a particular input on a keypad (or indicate by voice if speech recognition is used), if a particular suggested time slot is acceptable to the calling party. The calling party responds by accepting one of the suggested time slot or rejecting all of the time slots. If the calling party rejects all the time slot, steps 92 and 93 are repeated until an acceptable time slot is found.

In a step 94, the agent module reserves the time slot in the calendar for the called party. Additional information may be exchanged between the agent module and the calling party. For example, the agent module can query the calling party for a number at which the calling party may be reached. Also, the agent module can query the calling party as to who will initiate the telephone call. However, if the called party has expressed a preference as to who will make the call back, the indicated preference of the called party will be followed. The calling party responds, for example, via a keypad or by voice (when speech recognition is implemented). In a preferred embodiment of the present invention, the calling party's number is captured when the call is originally made. Also, in a preferred embodiment, the agent module communicates to the calling party the number where the called party may be reached if it is not the number originally dialed by the calling party. This communication is accomplished, for example, using speech synthesis.

In a step 95, the agent module notifies the called party of the changes made to the calendar. For example, the agent module does this utilizing electronic mailing system 16 or voice mail system 14. Additionally, when the agent module possesses an e-mail address for the calling party (for example by querying the calling party for an e-mail address or via a data base look-up on the calling party's number or other calling party identification), the agent module confirms to the calling party, e.g., to computing system 33 via an e-mail address, information pertaining to the telephone call.

In one embodiment of the invention, if there is a failure to schedule the call to be within a certain specified time period, both parties are notified of the failure. The calling party may be notified, for example, by speech synthesis, voice mail and/or e-mail. The called party is notified, for example, by voice mail and/or e-mail.

In another embodiment of the present invention, a remote software agent is used in the negotiations to find a time slot for a telephone call. This is illustrated by the flow chart in FIG. 10.

Figure 10:
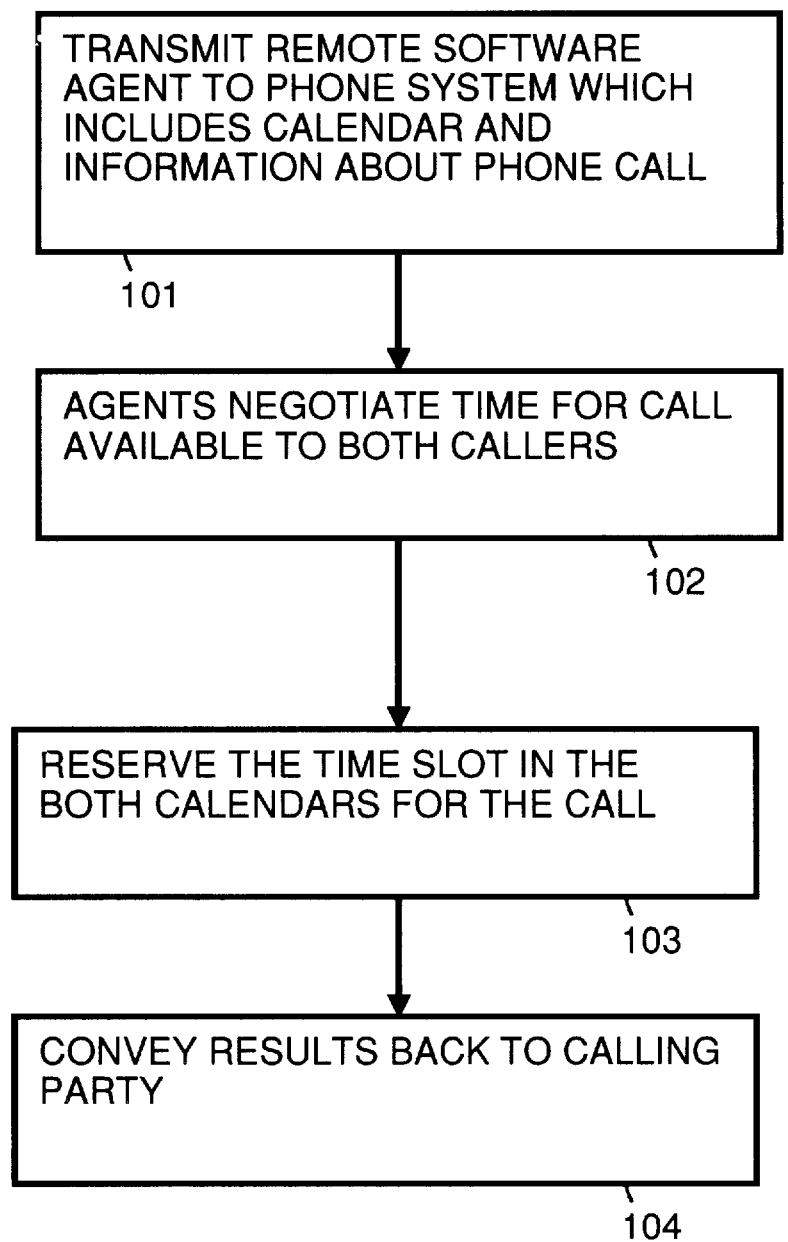
FIG. 10 is a simplified flowchart which illustrates use of a remote software agent module when calendaring a phone call in accordance with an alternative preferred embodiment of the present invention.

In FIG. 10, in order to negotiate a telephone call, the caller utilizes a remote software agent. The remote software agent includes information about the calendar of the calling party and the information about the phone call, such as the estimated duration of the phone call and who will initiate the telephone call. However, if the called party has expressed a preference as to who will make the call back, the indicated preference of the called party will be followed.

In a step 101, the remote software agent is transmitted to calendar system 15. This is done, for example, via a data communication link such as that between telephone exchange system 20 and telephone exchange system 10. For example the D-channel for an ISDN line is used. Alternatively, the remote software agent could be transmitted through another data link such as illustrated in FIG. 8 by data link 41.

In a step 102, the remote software agent negotiates with an agent module resident in calendar system 15 which has access to the calendar of the called party. The negotiation to determine a time slot is, for example, uses the methodology set out in FIG. 6, or some other methodology.

In a step 103, the agent module reserves the time slot in the calendar for the called party. In a step 104, the remote software agent module conveys the time slot back to the calling party. This can be done, for example, through one of the data links described above (e.g., ISDN link, other phone link or other network link). Alternatively the remote agent software can make contact using an electronic mailing system or a voice mail system.

Figure 11:
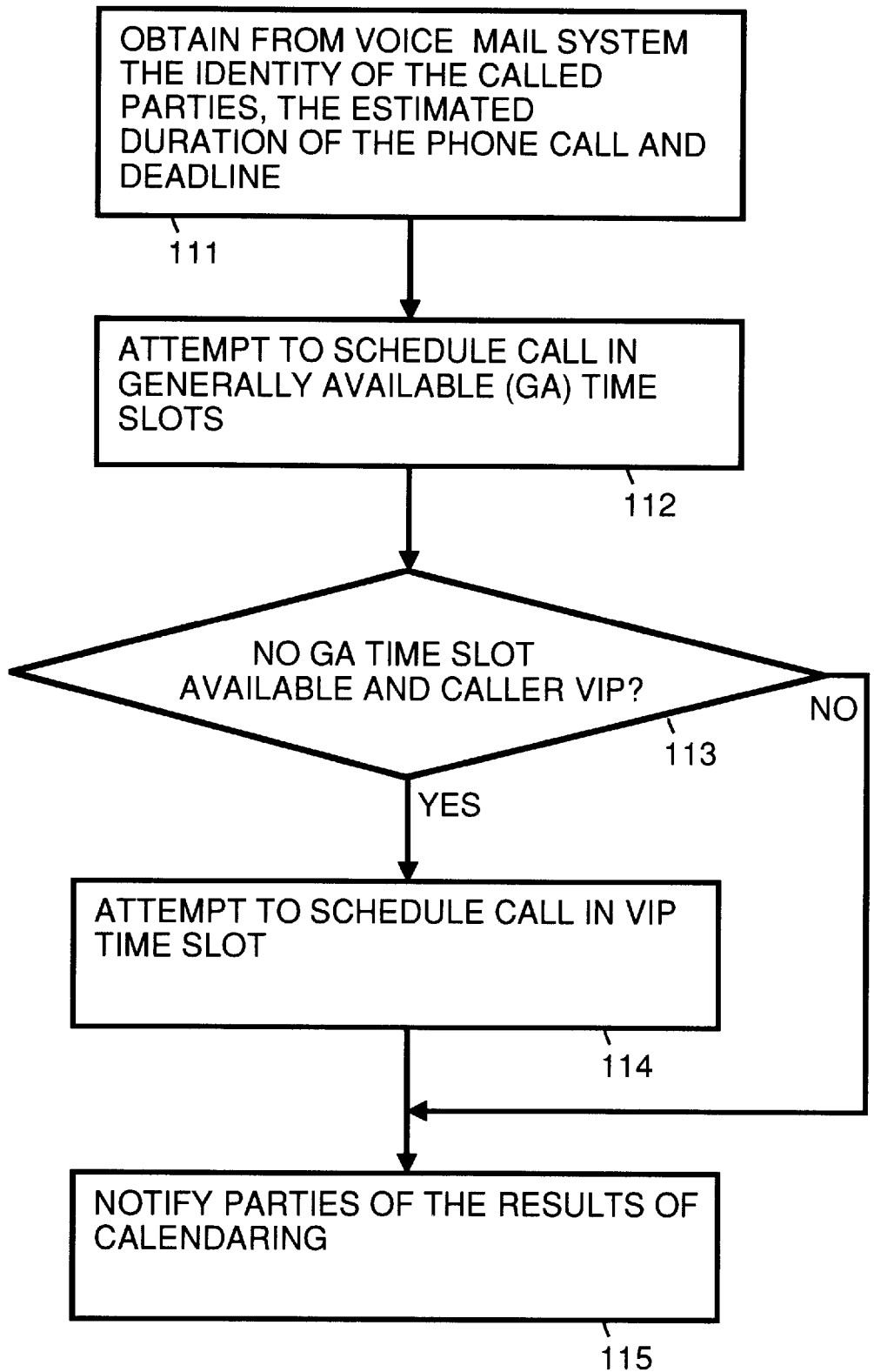
FIG. 11 is a simplified flowchart which illustrates operation of an agent module when there are different priority time slots used in calendar in accordance with another alternative preferred embodiment of the present invention.

FIG. 11 is a flowchart which illustrates how levels of priority may be used when scheduling telephone calls. For example, in Table 1 and Table 2, certain time slots are listed as urgent only. These urgent only slots can be considered as special time slots available only to certain very important people (VIPs) under special circumstances. Additional other levels also may be added and utilized. For example, the VIPs may be identified by calling number, password (received, for example from keypad or voice recognition), or some other method.

In a step 111, the agent module obtains the identity of the called party. Additional information, such as the estimated duration of the phone call and who will initiate the telephone call, is obtained, for example by querying the calling party and requesting the calling party to input from the calling party's telephone keypad. However, if the called party has expressed a preference as to who will make the call back, the indicated preference of the called party will be followed. Alternatively, speech recognition can be used to obtain input from the calling party. In addition, a deadline for scheduling the call is obtained. If the calling party also is a VIP (or some other type of party which is able to schedule call at a higher level), this information also may be obtained at this time.

In a step 112, the agent module attempts to schedule a call within the generally available (GA) time slots before the deadline. This is done using any of the methodologies discussed above.

In a step 113, the agent module determines whether a call was successfully scheduled using GA time slots. If a call was not successfully scheduled and the calling party is a VIP (or some other type of party which is able to schedule call at a higher level), in a step 114, the agent module attempts to schedule a call within the urgent (VIP) time slots available before the deadline. This is done using any of the methodologies discussed above.

In a step 115, the parties are notified of the results of the calendaring. As discussed above, this includes, for example, reserving time in the calendar of the called party for the telephone call and notifying the calling party (via voice synthesis, voice mail, e-mail, etc.) of the scheduled time of the phone call. If there is a failure to schedule the call, both parties are notified of the failure. The calling party may be notified, for example, by speech synthesis, voice mail and/or e-mail. The called party is notified, for example, by voice mail and/or e-mail.

Figure 12:
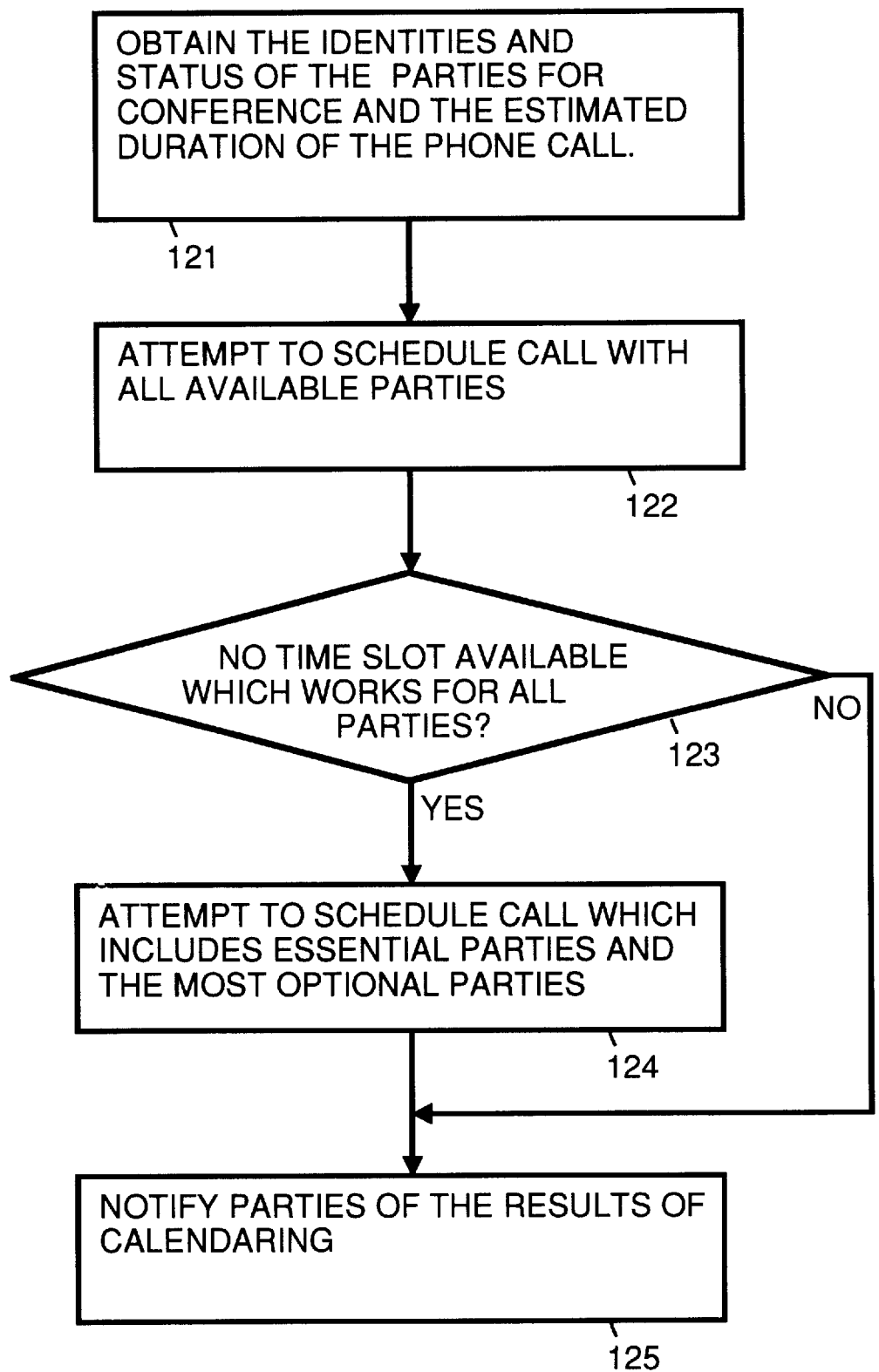
FIG. 12 is a simplified flowchart which illustrates setting up a conference call in accordance with a preferred embodiment of the present invention.

FIG. 12 is a flowchart which illustrates how the principles of the present invention may be used to schedule a conference call among more than two parties.

In a step 121, the agent module obtains the identity of the parties for the conference. This includes, for example, an indication as to which parties are essential for the conference call and which parties are optional. Additional information, such as the estimated duration of the phone call and who will initiate the telephone call, can be obtained, for example, from the party initiating the scheduling of the conferencing call. However, if the called party has expressed a preference as to who will make the call back, the indicated preference of the called party will be followed. In addition, a deadline for scheduling the call can be obtained.

In a step 122, the agent module attempts to schedule the conference call before any entered deadline. This is done using any of the methodologies discussed above, modified, however, so that the conference call is scheduled at a time which is acceptable to all parties to the conference call.

In a step 123, the agent module determines whether a call was successfully scheduled at a time acceptable to all parties. If a call was not successfully scheduled (and presuming there are some parties marked as optional), in a step 124, the agent module attempts to schedule the conference call before any entered deadline so that the conference call includes all essential parties and as many optional parties as possible.

In a step 125, the parties to the conference are notified of the results of the calendaring. As discussed above, this includes, for example, reserving time in the calendar of any party to the conference call which is accessible to the agent module and by notifying the other parties (and preferably all parties) to the conference call via voice synthesis, voice mail, e-mail, and/or some other means, of the scheduled time of the conference call.

Other variations of the present invention also may be implemented. For example, instead of the calling party actually placing a call to the called party, the telephone call may be set up entirely using e-mail. This is done, for example, by the "calling party" sending e-mail to an e-mail address used by the "called" party for setting up telephone calls. The e-mail is directed to an agent module within the calendar system which schedules the telephone call. If the agent module has access to calendars for both parties, the agent module can set up the phone call using the methodology described above. If the agent module does not have access to the calendar for the "calling" party, other methods can be used to schedule the call. For example, the e-mail message may include a list of potential times from the "calling" party which the agent module may select from for scheduling the call. The agent module then sends an e-mail to the "calling party" (and optionally the "called" party as well) indicating the time slot in which the call is scheduled. Alternatively, the agent module can contact—via e-mail, a network connection, or some other connection link—an agent module for the "calling" party and schedule a telephone call using one of the methodologies discussed above.

What is claimed is:

1. A telephone system comprising:

an interface means for receiving a call placed by a calling party to a called party, and if the called party is unavailable, receiving a scheduling request for a future telephone call with the called party from the calling party;

calendar data stored in a computer readable medium which includes calendars of the called party and the calling party; and an agent means, coupled to the interface means and to the computer readable medium, for, in response to the scheduling request, searching the calendars to determine a common available slot for the future telephone call, and after confirming that the common available slot is acceptable to the calling party, scheduling the future telephone call in the common available slot of the calendars.

2. A telephone system as in claim 1 wherein the interface means includes:

keypad recognition means for recognizing input from the calling party when the calling party utilizes a telephone keypad; and, speech synthesis means for communicating with the calling party using speech synthesis.

3. A telephone system as in claim 1 wherein the interface means includes:

speech recognition means for recognizing input from the calling party when the calling party communicates by speech.

4. A telephone system as in claim 1 additionally comprising:

an electronic mail system interface for interfacing with an electronic mail system.

5. A telephone system as in claim 1 additionally comprising:

a database for storing information identifying the called party.

6. A telephone system as in claim 5 wherein the database also stores information identifying the calling party.

7. A telephone system as in claim 1 wherein the request from the calling party to schedule the future telephone call is received via electronic mail.

8. A computer implemented method for scheduling a future telephone call comprising the steps of:

(a) receiving a call placed by a calling party to a called party, and if the called party is unavailable, receiving a scheduling request for a future telephone call with the called party from the calling party, said scheduling request including data indicating an estimated duration of the future telephone call;

(b) searching calendars of the called party and the calling party to determine a common available slot for the future telephone call; and, (c) confirming that the common available slot is acceptable to the calling party, and when confirmed, performing the following substep:

(c1) scheduling the future telephone call in the common available slot of the calendars.

9. A computer implemented method as in claim 8 wherein step (a) includes the following substeps:

(a.1) requesting the calling party to indicate the estimated duration of the telephone call; and, (a.2) receiving from the calling party the estimated duration of the telephone call.

10. A computer implemented method as in claim 9 wherein substep (a.2) includes receiving the estimated duration of the telephone call as input from the calling party using a telephone keypad.

11. A computer implemented method as in claim 9 wherein substep (a.2) includes receiving the estimated duration of the telephone call as input spoken by the calling party and recognized using speech recognition technology.

12. A computer implemented method as in claim 8 wherein the confirming in step (c) is done by checking a calendar for the calling party to determine whether the available slot for the telephone call is available in the calendar for the calling party.

13. A computer implemented method as in claim 12 wherein step (c) additionally comprises the following substep performed when the available slot for the telephone call is acceptable to the calling party:

(c.2) scheduling the telephone call in the calendar of the calling party.

14. A computer implemented method as in claim 8 wherein the confirming in step (c) is done by querying the calling party as to whether the available slot for the telephone call is acceptable to the calling party.

15. A computer implemented method as in claim 8 wherein step (c) additionally comprises the following substep performed when the available slot for the telephone call is acceptable to the calling party:

(c.2) sending electronic mail to the called party indicating that the telephone call has been scheduled in the calendar.

16. A computer implemented method as in claim 8 wherein:

step (b) includes finding a plurality of available slots for the telephone call; and, step (c) includes querying the calling party as to whether any of the plurality of available time slots are acceptable to the calling party.

17. A computer implemented method as in claim 8 additionally comprising the following step:

(d) when performance of steps (b) and (c) do not result in any available slot for the telephone call that is acceptable to the calling party, re-performing steps (b) and (c) additionally accessing special time segments within the calendar of the called party which are not marked as available.

18. A computer implemented method as in claim 17 wherein in step (d) the special time segments are marked as an equivalent of "urgent only".

19. A computer implemented method as in claim 17 additionally comprising the following step:

(e) when performance of step (d) does not result in any available slot for the telephone call that is acceptable to the calling party, notifying the called party of the attempt by the calling party to schedule a call.

20. A computer implemented method as in claim 17 wherein step (d) is only performed when the calling party is within a special class of callers.

21. A computer implemented method as in claim 8 wherein step (c) is accomplished using a remote software agent which represents the calling party.

22. A computer implemented method as in claim 8 wherein the telephone call is a conference call.

23. A computer implemented method as in claim 8 additionally comprising the following step:

(d) when performance of steps (b) and (c) do not result in any available slot for the telephone call that is acceptable to the calling party, notifying the called party of the attempt by the calling party to schedule a call.

24. Storage media which stores software which, when executed on a computing system within a telephone system, performs a method for scheduling a future telephone call, the method comprising the steps of:

(a) receiving a call placed by a calling party to a called party, and if the called party is unavailable, receiving a scheduling request for a future telephone call with the called party from the calling party, said scheduling request including data indicating an estimated duration of the future telephone call;

(b) searching calendars of the called party and the calling party to determine a common available slot for the future telephone call; and, (c) confirming that the common available slot is acceptable to the calling party, and when confirmed, performing the following substep:

(c1) scheduling the future telephone call in the common available slot of the calendars.

25. Storage media as in claim 24 wherein step (a) includes the following substeps:

(a.1) requesting the calling party to indicate the estimated duration of the telephone call; and, (a.2) receiving from the calling party the estimated duration of the telephone call.

26. Storage media as in claim 25 wherein substep (a.2) includes receiving the estimated duration of the telephone call as input from the calling party using a telephone keypad.

27. Storage media as in claim 25 wherein substep (a.2) includes receiving the estimated duration of the telephone call as input spoken by the calling party and recognized using speech recognition technology.

28. Storage media as in claim 24 wherein the confirming in step (c) is done by checking a calendar for the calling party to determine whether the available slot for the telephone call is available in the calendar for the calling party.

29. Storage media as in claim 28 wherein step (c) additionally comprises the following substep performed when the available slot for the telephone call is acceptable to the calling party:

(c.2) scheduling the telephone call in the calendar of the calling party.

30. Storage media as in claim 24 wherein the confirming in step (c) is done by querying the calling party as to whether the available slot for the telephone call is acceptable to the calling party.

31. Storage media as in claim 24 wherein step (c) additionally comprises the following substep performed when the available slot for the telephone call is acceptable to the calling party:

(c.2) sending electronic mail to the called party indicating that the telephone call has been scheduled in the calendar.

32. Storage media as in claim 24, wherein the method additionally comprises the following step:

(d) when performance of steps (b) and (c) do not result in any available slot for the telephone call is acceptable to the calling party, re-performing steps (b) and (c) additionally accessing special time segments within the calendar of the called party which are not marked as available.

33. Storage media as in claim 32 wherein in step (d) the special time segments are marked as an equivalent of "urgent only".

34. Storage media as in claim 32 wherein step (d) is only performed when the calling party is within a special class of callers.

35. Storage media as in claim 32, wherein the method additionally comprises the following step:

(e) when performance of step (d) does not result in any available slot for the telephone call that is acceptable to the calling party, notifying the called party of the attempt by the calling party to schedule a call.

36. Storage media as in claim 34 wherein step (c) is accomplished using a remote software agent which represents the calling party.

37. Storage media as in claim 24 wherein the telephone call is a conference call.

38. Storage media as in claim 24, wherein the method additionally comprises the following step:

(d) when performance of steps (b) and (c) do not result in any available slot for the telephone call that is acceptable to the calling party, notifying the called party of the attempt by the calling party to schedule a call.

* * * * *